M. A. BAILEY.
MEANS FOR EDUCATIONAL TESTS.
APPLICATION FILED AUG. 9, 1921.
1,437,037.
Patented Nov. 28, 1922.
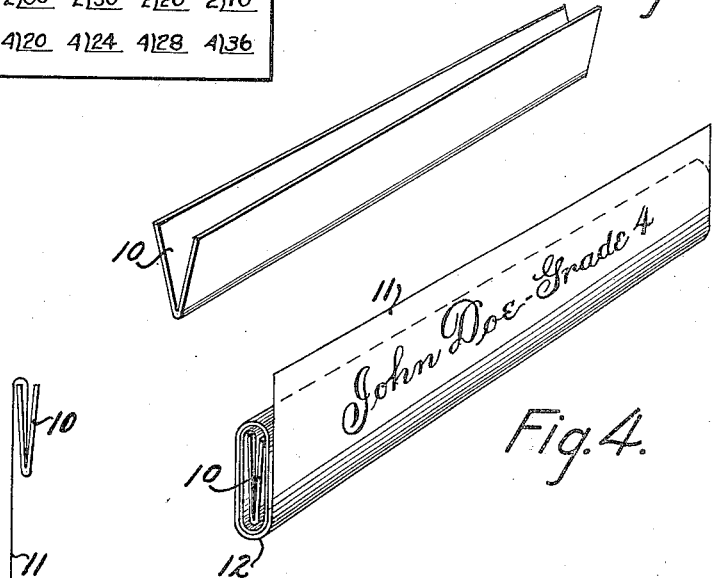

Patented Nov. 28, 1922.

1,437,037

UNITED STATES PATENT OFFICE.

MIDDLESEX A. BAILEY, OF YONKERS, NEW YORK.

MEANS FOR EDUCATIONAL TESTS.

Application filed August 9, 1921. Serial No. 490,883.

*To all whom it may concern:*

Be it known that I, MIDDLESEX A. BAILEY, a citizen of the United States, residing in Yonkers, county of Westchester, State of New York, have invented a certain new and useful Improvement in Means for Educational Tests, of which the following is a specification.

It is customary in many school systems to make periodical tests of the proficiency and progress of the pupils by issuing cards upon which are printed standard problems for the solution of which a certain limited time is allowed.

The problems were printed at first side by side in horizontal rows, spaces being left between the rows wherein the pupils were expected to write their solutions. This plan proved expensive, because each card could, of course, be used only once.

The present invention relates to a contrivance of maximum simplicity which has every advantage of the card with printed problems spaced as above described, and whereby each pupil is enabled to write his solutions upon a blank sheet of cheap paper which can be thrown away with relatively small loss.

The invention is illustrated in a preferred form in the accompanying drawings wherein Figure 1 shows an example of a standard problem sheet or card, Figure 2 is a perspective view of my preferred folding core, Figure 3 is an end view of the same as applied to the solution sheet and Figure 4 is a perspective view of the core combined with a fully folded solution sheet.

It is obvious that a pupil might be called upon to simply determine his solutions mentally and set them down in order upon a separate piece of paper. This, however, requires the carrying of the problem in the mind, and too much time is taken up in finding the next problem after each solution. Moreover this method affords too great an opportunity for mistakes and omissions each time the eye returns to the problem sheet. It is for this reason that the sheets have been made hitherto with spaces below each problem, so that the pupil can make no mistake or omission of this kind. By my invention this end is attained without defacing the problem sheet.

The problem sheet shown in Figure 1 has a series of horizontal rows of problems in division. Instead of spoiling the sheet by writing the solutions upon the spaces under the rows pupils may write on a separate sheet and still have the advantage of writing each solution directly under its own problem as follows.

I supply a folding core comprising preferably a rectangular thin flat body 10 of cardboard or other material which can be folded over along a median line as shown in Figures 2, 3 and 4. The end of the solution sheet 11 is fitted into this fold, lying along the line of fold, and the sheet is then simply folded over and over the core 10, turning the latter always in the same direction, and neatly creasing after each fold. This finally produces the "solution-blank" shown in Figure 4, which can be used as follows.

Setting the solution-blank in front of him with the free edge uppermost, the pupil writes his name and grade upon the narrow flat blank space before him. He then turns the solution-blank over and brings the creased edge 12 into the position shown by the dotted line 13, directly under the first row of problems. With the blank in this position, he writes his solution of each problem immediately under it.

He then unfolds the sheet 11 by a half turn of the solution-blank, thus exposing the next rectangular section to view, and brings the creased portion just under his previously written solutions into a line directly under the second row of problems on the problem sheet. This cycle of operations being repeated for each line on the problem sheet, the solution sheet is finally completed. This method of use leaves the problem sheet undefaced, and it can be used over and over again.

It will be noted that this arrangement makes a wide spacing between horizontal rows on the problem sheet entirely unnecessary, thus saving cardboard.

The present invention is also applicable for other purposes. For instance, in learning penmanship, the pupil can copy a given model line repeatedly, while still having the model close to his own writing, instead of making successive copies further and further away from the model as heretofore. This saves the pupil from all danger of simply copying his own line and producing copies of copies.

What I claim is—

1. In combination with a problem sheet bearing rows of stated problems, a solution blank comprising a thin flat narrow rectangular core of relatively resistant material and a sheet of writing paper folded sharply over and over on said core so as to form successive writing spaces adapted to be set successively under the different rows of problems on said problem sheet.

2. Apparatus as in claim 1 wherein the central core is composed of two joined flaps and wherein one edge of the paper is inserted between said flaps.

In testimony whereof I have hereto set my hand on this 8th day of August 1921.

MIDDLESEX A. BAILEY.